(No Model.)

M. H. KOONTZ.
NUT LOCK.

No. 386,834. Patented July 31, 1888.

WITNESSES
Henry G. Dieterich
Theodore S. West

INVENTOR
Middleton H. Koontz
by C. A. Snow & Co.
Attorneys

N. PETERS, Photo-Lithographer, Washington, D. C.

UNITED STATES PATENT OFFICE.

MIDDLETON HARMON KOONTZ, OF ZELA, WEST VIRGINIA.

NUT-LOCK.

SPECIFICATION forming part of Letters Patent No. 386,834, dated July 31, 1888.

Application filed March 26, 1888. Serial No. 268,538. (No model.)

*To all whom it may concern:*

Be it known that I, MIDDLETON HARMON KOONTZ, a citizen of the United States, residing at Zela, in the county of Nicholas and State of West Virginia, have invented a new and useful Improvement in Nut-Locks, of which the following is a specification.

The invention relates to improvements in nut-locks; and it consists in the construction and novel combination of parts hereinafter described, illustrated in the accompanying drawings, and pointed out in the appended claim.

Figure 1:
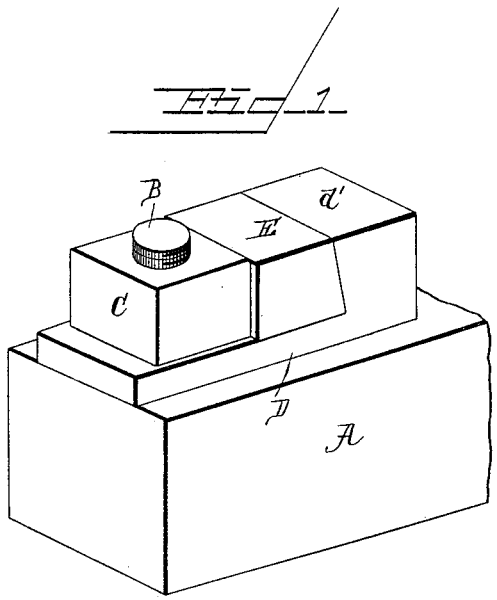
Figure 2:
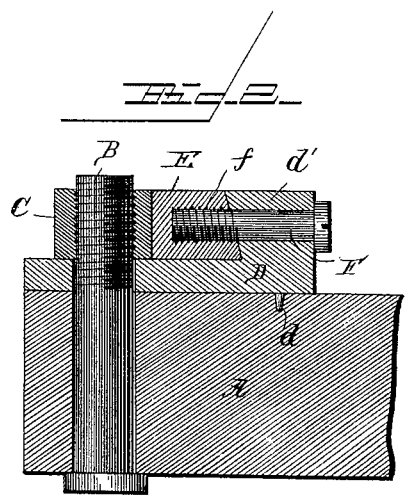

In the drawings, Figure 1 represents a beam to which is attached a nut-lock embodying the invention. Fig. 2 represents a central longitudinal section of said beam and nut-lock.

Referring to the drawings by letter, A designates a beam provided with a suitable opening, through which passes the bolt B, engaging on its tapped end a nut, C, of ordinary construction.

D is an elongated washer, preferably rectangular, having a suitable bolt-hole near one end, and near the other end, on its inner surface, a projecting pin, $d$, which enters a corresponding recess in the beam when the washer is in place, or forces itself into the substance of the beam when the nut is turned up. Rising from the outer surface of the washer, at the end over said pin $d$, is a transverse flange, $d'$, the inner edge of which is beveled inwardly and away from the nut. The said flange rises from the washer to about the height of the nut.

E is a locking-block having parallel flat inner and outer surfaces, an inner edge at right angles to said surfaces, which edge, when in place, fits against the adjacent edge of the nut, and an outer edge beveled to correspond with and fit against the beveled edge of the flange, the block, when in place, fitting nicely between the nut and flange.

F is a screw passing through a suitable opening made transversely in the flange $d'$, and engaging a tapped recess, $f$, in the beveled side of the block E. When said block is removed, the nut is free to be turned up; but it is evident that when the parts are in place and the screw F turned into the recess $f$ of the block, locking the latter, the nut can be turned in neither direction.

When the device is applied to a fish-plate of a rail-joint, a suitable recess must be made in the outer surface of the fish plate for the pin $d$.

Having described my invention, I claim—

The combination of the nut C, the elongated washer D, having a pin, $d$, standing from its inner surface near one end opposite that adjacent to the bolt-hole, and having a flange, $d'$, with its inner edge beveled inwardly away from the nut, the locking-block E, beveled on its outer edge, fitting closely between the nut and flange $d'$, and provided with a tapped recess, $f$, and the screw F, passing through a suitable opening in the flange $d$ and engaging in the recess $f$, the nut, the flange, and the locking-block having their outer surfaces flush with each other, substantially as specified.

In testimony that I claim the foregoing as my own I have hereto affixed my signature in presence of two witnesses.

MIDDLETON HARMON KOONTZ.

Witnesses:
HOWARD TEMPLETON,
A. J. HORAN.